United States Patent [19]

Arots

[11] Patent Number: 4,686,047
[45] Date of Patent: Aug. 11, 1987

[54] PROCESS FOR DETACKIFICATION OF PAINT SPRAY OPERATION WASTES

[75] Inventor: Joseph B. Arots, Wilmington, Del.

[73] Assignee: Calgon Corporation, Pittsburgh, Pa.

[21] Appl. No.: 809,693

[22] Filed: Dec. 16, 1985

Related U.S. Application Data

[63] Continuation-in-part of Ser. No. 779,399, Sep. 24, 1985, abandoned.

[51] Int. Cl.$^4$ ............................................... C02F 1/56
[52] U.S. Cl. ........................................ 210/712; 55/85; 134/38; 210/725; 210/728; 210/736
[58] Field of Search ............... 55/19, 84, 85; 134/38; 210/702, 712, 725, 727, 728, 736; 427/331

[56] References Cited

U.S. PATENT DOCUMENTS

| | | | |
|---|---|---|---|
| 3,515,575 | 6/1970 | Arnold | 210/701 |
| 3,700,623 | 10/1972 | Keim | 525/328.3 |
| 3,833,531 | 9/1974 | Keim | 162/168.4 |
| 3,990,869 | 11/1976 | Forney | 55/19 |
| 3,990,986 | 11/1976 | Gabel et al. | 210/728 |
| 4,002,490 | 5/1977 | Michalski et al. | 134/38 |
| 4,067,806 | 1/1978 | Mauceri | 210/728 |
| 4,130,674 | 12/1978 | Roberts et al. | 427/331 |
| 4,440,647 | 4/1984 | Puchalski | 210/725 |

Primary Examiner—Peter Hruskoci
Attorney, Agent, or Firm—W. C. Mitchell; M. C. Sudol, Jr.

[57] ABSTRACT

An improvement in the process for detackifying oversprayed paint, lacquer or enamel entrained in the water in water wash paint spray operations comprises maintaining in the wash water a small amount of the water-soluble reaction product of a polymer of N-alkyldiallylamine hydrohalide and epihalohydrin.

8 Claims, No Drawings

PROCESS FOR DETACKIFICATION OF PAINT SPRAY OPERATION WASTES

This application is a continuation-in-part of U.S. application Ser. No. 779,399 filed Sept. 24, 1985 now abandoned.

This invention relates to an improved process for detackifying paint, lacquer or enamel spray operation wastes. In particular this invention relates to the use of a water-soluble resinous reaction product of a polymer of N-alkyldiallylamine hydrohalide and epihalohydrin in processes of the type in which water is employed to wash the air in the paint spray operation and to remove over-sprayed paint, lacquer or enamel.

BACKGROUND OF THE INVENTION

Automobile bodies, bicycles, toys, appliances and other industrial and consumer articles are conventionally spray painted in areas called spray booths wherein water curtains are employed to wash the air and to remove over-sprayed paint, lacquer or enamel solids, the wash water is treated to remove solids and the treated water is recirculated.

A major problem associated with spray painting operations concerns the tacky or adhesive nature of the over-sprayed organic solids. The solids tend to agglomerate and accumulate on the walls, ceiling and floor of the spray area and to clog water spray equipment, recirculating pumps and the like.

One solution which has been found to have practical application to the problem involves the use of chemicals which, when added to the water, detackify the paint, lacquer or enamel solids. A wide variety of chemicals have been proposed for this use and those which have attracted particular interest involve the combination of long carbon chain surface active nitrogen derivatives or certain cationic polymers with multi-valent metal salts which form insoluble hydroxides at a pH greater than about 7. The use of combinations of this type are described in U.S. Pat. Nos. 3,861,887 to Forney; 3,990,986 to Gabel et al; 4,002,490 to Michalski et al; 4,067,806 to Manceri; 4,130,674 to Roberts et al; and 4,440,647 to Puchalski. While these compositions are generally effective in detackifying and removing paint overspray, a need exists for compositions having higher efficiency in order to increase productivity and to achieve a high degree of effectiveness for all types of paints and particularly solvent-borne paints, lacquers and enamels.

DESCRIPTION OF THE INVENTION

Now, in accordance with this invention it has been found that the water-soluble reaction products of polymers of N-alkyldiallylamine hydrohalide and epihalohydrin are effective and efficient detackifiers for waterborne or solvent-borne paints, lacquers and enamels and that their effectiveness and efficiency are not dependent on the presence of added multi-valent metal salts. Accordingly, the present invention relates to an improved process for denaturing over-sprayed paints, lacquers or enamels entrained in the water in water wash paint spray operations, the improvement comprising adding to the water being circulated in the paint spray operation an effective amount for the purpose of detackifying the oversprayed paint, lacquer or enamel of a water-soluble resinous reaction product of a polymer of N-alkyldiallylamine hydrohalide and epihalohydrin.

The water-soluble resins used in this invention are reaction products of (1) linear polymers produced by polymerizing at least one water-soluble salt of a diallylamine

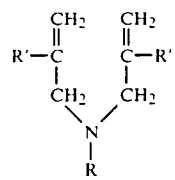

where R is alkyl or a substituted alkyl group and each R' is alike or different and is hydrogen or a lower alkyl group and (2) an epihalohydrin. The linear polymers typically have a number average molecular weight of 2000 to 500,000, preferably 4000 to 75,000 and more preferably 10,000 to 30,000. The active form of these resins, which is at a pH of at least 8, is believed to contain units of the formula:

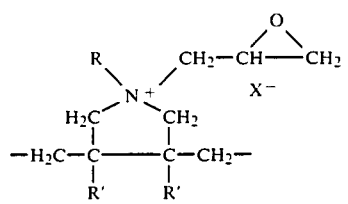

or of the formula:

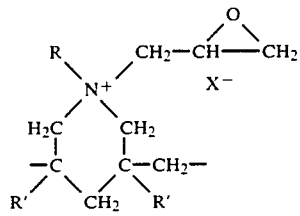

where R and R' are as set forth above and X is an anion, or to be mixtures of I and II. There can also be some short chain branching in the units as a result of the ability of the epoxide group to chain out. In the above formulae, R is preferably a $C_{1-6}$ alkyl and more preferably is methyl, ethyl, propyl, isopropyl or butyl and each R' is preferably hydrogen. Generally anion, X, is halide and preferably is chloride or bromide. The most preferred water soluble reaction product for use in this invention is a poly(N-methyldiallylamine)-epichlorohydrin resin.

At acidic pH, i.e. a pH of less than 5, the units of the resins are believed to have the formula:

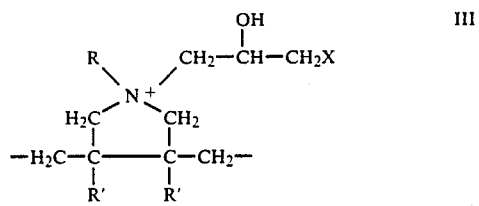

or the formula:

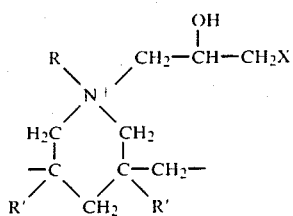

where R, R' and X are as set forth above, or to be mixtures of III and IV.

The preferred resins of this invention can be prepared by polymerizing the hydrohalide salt of an N-alkyldiallylamine and reacting the polymer of N-alkyldiallylamine hydrohalide thus formed with an epihalohydrin, particularly epichlorohydrin, using methods of preparation known in the art. See, for example, the methods set forth in U.S. Pat. Nos. 3,700,623 and 3,833,531 to Keim, the disclosures of which are incorporated by reference. The resulting resin solution prior to dilution generally has a total solids content of about 20% to about 21%.

The resinous reaction products of polymers of N-alkyldiallylamine hydrohalide and epihalohydrin are conventionally prepared in aqueous solution at a pH of from about 7 to about 9.5 and the resins will contain units of the structures I or II above or both and will have a tendency to gel on standing. The resin solution is therefore usually stabilized against gelation by adding to the aqueous solution sufficient acid, such as hydrochloric acid, to obtain and maintain the pH at about 2. The stabilized resin will contain units of the structure III or IV or both. As such, the resins are referred to in the art as acid-stabilized resins. The resins are usually marketed in the acid-stabilized form and can be used as such or reactivated prior to use by known means to reestablish the I or II or both units. Means of reactivating acid-stabilized resin solutions are described in U.S. Pat. No. 3,833,531. The preferred means of reactivation is by the addition of alkali, usually aqueous sodium hydroxide, sodium carbonate, sodium bicarbonate and the like or mixtures thereof.

Use of the water-soluble reaction products of polymers of N-alkyldiallylamine hydrohalide and epichlorohydrin of this invention as detackifiers for paint spray operation water are typically carried out by adding an aqueous solution of the resin to fresh or recirculated water at a convenient location in the system such as at the sump, upstream from the pumps or at any advantageous location in the recirculation system and preferably before the water enters the spray area circuit. Since under normal conditions spray operation water will usually have a pH of at least 6, pH adjustment is not generally necessary unless the resin is in its acid stabilized form. However, if the pH of the water falls below about 6, adjustment is necessary and can be conveniently carried out by adding an alkaline pH control agent such as an alkali metal hydroxide, carbonate, bicarbonate, silicate and the like. The pH range which provides maximum operating efficiency with the resins of the invention is about 8 to 13.

The amount of resin added to the spray operation water should be sufficient to reduce the tackiness of paint, lacquer or enamel solids and to condition the solids so that they can readily be separated from the water, as for example by decantation or filtration, and the water can be recycled to the operation. Under normal conditions the dosage level is within the range of 1 to 50,000 ppm (based on active resin solids), preferably 2 to 40,000 ppm and most preferably 5 to 30,000 ppm.

As indicated above, the practice of this invention does not require the presence of salts of multi-valent metals which form insoluble hydroxides at pH values greater than about 7 or other additives to achieve high performance and efficiency. Such additives, however, have not been found to detract from the advantages realized by this invention and may under exceptional conditions provide marginal improvement with certain custom spray formulations. Typical water-soluble salts of multi-valent metals of this type include the salts of zinc, iron, aluminum, calcium, magnesium, manganese, tin and the like. The preferred metal salts are zinc chloride, aluminum chloride, aluminum sulfate, ferric chloride, ferric sulfate, calcium chloride, magnesium chloride and magnesium sulfate. Additionally, it may be desirable under certain conditions to include one or more surfactants which act as frothing agents or wetting agents for the solids, defoamers for the system, or the like. The preferred surfactants are compatible with the system and are non-ionic low molecular weight polyethers derived from polyalkylene oxides and particularly polymers containing ethylene oxide and propylene oxide units, the polyoxyethylene glycols and the polyoxypropylene glycols. When salts of multi-valent metals and/or surfactants are used, the amount of each will usually range from 0.001 to 10% and preferably will be from 0.002 to 2.5% based on the amount of water.

Other additives which can be present in amounts up to about 5% include clays, particularly bentonite, carbon black, talc, gums, starch, dextrin, lime, aluminum oxide, silica sols, casein and the like.

The invention is further illustrated by the following examples which demonstrate the best known embodiment of the invention. In these examples a test method is devised to evaluate the effectiveness of the use of the reaction product of a polymer of N-methyldiallylamine hydrohalide and epichlorohydrin alone or with a multivalent metal salt (zinc chloride) or a nonionic surfactant (Alkatronic PGP 18-2LF) to reduce the tackiness of paint solids in water samples containing different types of paints. The preparation of the resin used in these examples is described in Example A, below. The paints employed in the examples include three classes of solvent-borne paints (an acrylic lacquer, an acrylic enamel and a urethane resin enamel) and a water-borne paint (a vinyl acetate/acrylic latex). Tackiness (or detackification) of the samples for Examples 1 to 9 and 13 is evaluated by observing the manner in which the paint solids are dispersed and the degree of adherence of the solids to the interior surfaces of the vessel and to a dipstick. Control samples (no treatment) are also evaluated in the same manner. In like manner, a series of comparative samples are prepared and evaluated using as the cationic resin Hercules resin RETEN ® 763, the preferred resin described in U.S. Pat. No. 4,440,647 to Puchalski. The degree of detackification is evaluated using a rating scale of 1 to wherein the numbers have the following assigned meaning:

1—excellent—paint forms particles or small globules which do not adhere to the exposed surface of the vessel or dipstick and are dispersed throughout aqueous medium.

2—very good—paint forms particles or small globules some of which appear as specks on less than 1% of the exposed surface area of the vessel or dipstick.

3—good—paint forms granular flocs or globules which adhere to less than 10% of the exposed surface area of the vessel or dipstick.

4—fair—paint forms agglomerates which are slightly tacky to the touch, or tacky upon crushing.

5—failure—paint forms large tacky globules and/or coatings which adhere to more than 25% of the exposed surface area of the vessel or dipstick.

EXAMPLE A

An acid stabilized solution of the reaction product of poly(N-methyldiallylamine hydrochloride) having a reduced specific viscosity of 0.22, as determined on a 0.1% solution in aqueous 1 molar sodium chloride at 25° C., and epichlorohydrin is prepared according to the procedure of Example 24 of U.S. Pat. No. 3,833,531. The resulting solution contains 20.4% reaction solids.

EXAMPLE 1

To a glass vessel equipped with a Teflon coated stirring bar and charged with 2 liters of tap water adjusted to a pH of 10 with aqueous sodium hydroxide are added 6.7 grams (100 parts active solids per million parts of water (ppm)) of the activated solution of Example A. The acid stabilized solution of Example A is activated for use by diluting to 3% reaction solids with tap water and adjusting the pH to 12 with aqueous sodium hydroxide. Agitation is commenced, 5 ml. of a commercial acrylic lacquer (Lucite Acrylic Lacquer B 8322LH (light blue metallic) available from the du Pont Co.) are added to the vessel, agitation is continued at 200–300 rpm for 5 minutes and the resulting mixture is allowed to settle. The detackifying characteristics of the resulting mixture are evaluated visually by observing the paint solids and the extent of adhesion of the solids to the walls of the vessel and to a wooden dipstick ($\frac{3}{4}\times 6\times 1/16''$) following perpendicular immersion to about $\frac{1}{2}$ of its length into the mixture and gradual withdrawal. The results of the evaluation are set forth in the Table, below.

EXAMPLE 2

The procedure of Example 1 is repeated except that, a commercial, high solids acrylic enamel basecoat (Acrylic Enamel 707-E-83419 (light huron blue metallic) available from the du Pont Co.) is substituted for the acrylic lacquer.

EXAMPLE 3

The procedure of Example 1 is repeated except that a commercial urethane resin basecoat (Dueethane Universal Basecoat UBC-3554 (white) available from PPG Industries, Inc.) is substituted for the acrylic lacquer.

EXAMPLES 4–6

The procedure of Examples 1 to 3, respectively, is repeated except that 100 ppm of zinc chloride as a 10% aqueous solution are added to the vessel following introduction of the resin solution and prior to addition of the lacquer.

EXAMPLES 7–9

The procedures of Examples 1 to 3 are repeated except that 100 ppm of a nonionic surfactant (a polyoxyethylenepolyoxypropylene block copolymer type surfactant commercially available under the trade designation Alkatronic PGP 18-2LF from Alkaril Chemicals Inc.) are added to the vessel following introduction of the resin solution and prior to addition of the lacquer.

COMPARATIVE EXAMPLES 1C to 9C

The procedures of Examples 1 to 9, respectively, are repeated except that 100 ppm of a polyamide-epichlorohydrin resin commercially available from Hercules Inc. under the trade designation RETEN 763 are substituted for 100 ppm of the resin of Example A.

TABLE

| | Detackification Test Results | |
|---|---|---|
| | Vessel Walls | Dipstick |
| Control 1[a] | 5 | 5 |
| Ex 1 | 1 | 1 |
| Ex 1C | 5 | 5 |
| Control 2[a] | 5 | 5 |
| Ex 2 | 1 | 1 |
| Ex 2C | 5 | 5 |
| Control 3[a] | 5 | 5 |
| Ex 3 | 3 | 1[b] |
| Ex 3C | 5 | 5 |
| Ex 4 | 1 | 1 |
| Ex 4C | 3 | 3 |
| Ex 5 | 1 | 1 |
| Ex 5C | 3–4 | 1[b] |
| Ex 6 | 3 | 1[b] |
| Ex 6C | 3 | 1[b] |
| Ex 7 | 1 | 1 |
| Ex 7C | 1[c] | 1[c] |
| Ex 8 | 1 | 1 |
| Ex 8C | 1 | 1 |
| Ex 9 | 3 | 1[b] |
| Ex 9C | 3 | 1[b] |

[a] For controls 1 to 3, the procedure of Examples 1 to 3, respectively, is repeated except that the addition of 6.7 grams of the activated solution of Example A is omitted.
[b] Globules floating on surface of aqueous medium; globules do not adhere to dipstick.
[c] Globules tacky when crushed.

The above results demonstrate that the poly(N-methyldiallylamine)-epichlorohydrin resins of this invention are excellent detackification agents for acrylic lacquer and enamel solids and that the presence of zinc chloride or a non-ionic surfactant as an additional additive is neither required nor advantageous to the achievement of complete detackification. Compare Examples 1 and 2 with 4 and 5 and with 7 and 8. Similarly, the results of the table show that the resins of this invention provide good detackification of urethane base resin solids in the presence or absence of zinc chloride or a non-ionic surfactant. See and compare Example 3 with 6 and 9. Further, the results for the comparative Examples demonstrate that, at the same dosage level, the prior art cationic resin, RETEN ® 763, is not an effective detackification agent for lacquer, enamel or urethane base resin solids when used as the sole additive and that the presence of an amphotheric metal salt such as zinc chloride or a non-ionic surfactant is additionally required to achieve moderate detackification of paint solids in solvent-borne systems.

EXAMPLE 10

To a glass vessel equipped with a Teflon coated stirring bar and charged with 2 liters of tap water adjusted to a pH of 10 with aqueous sodium hydroxide are added 66.7 grams (1000 parts active solids per million parts of water (ppm)) of the activated solution of Example A. The acid stabilized solution of Example A is activated for use by diluting to 3% reaction solids with tap water and adjusting the pH to 12 with aqueous sodium hydroxide. Agitation is commenced, 5 ml. of a commercial water-borne vinyl acetate/acrylate latex paint (Muralo PVA 500 (white) available from the Muralo Company, Inc.) are added to the vessel, agitation is continued at 200-300 rpm for 5 minutes and the resulting mixture is allowed to settle. Next the aqueous phase is decanted and the walls and bottom of the vessel are observed for sludge deposition. No deposits are noted, indicating excellent detackification of the paint solids. When the procedure of this example is repeated except that the activated solution of Example A is omitted, a very heavy sludge deposit appears on the walls and bottom of the vessel.

COMPARATIVE EXAMPLE 10C

The procedure of Example 10 is repeated except that 1000 ppm of Hercules Inc.'s resin RETEN 763 are substituted for 1000 ppm of the resin of Example A. Sludge deposits are noted on the walls and bottom of the vessel, indicating poor detackification of the paint solids.

EXAMPLE 11

The procedure of Example 10 is repeated except that 100 ppm of zinc chloride as a 10% aqueous solution are also added to the vessel prior to introduction of the latex paint. Following decantation, no sludge deposits are noted on the walls or bottom of the vessel.

EXAMPLE 12

The procedure of Example 10 is repeated except that 100 ppm of the nonionic surfactant of examples 7-9 are also added to the vessel prior to introduction of the latex paint. No sludge deposits are noted on the walls or bottom of the vessel.

EXAMPLE 13

A glass vessel equipped with a Teflon coated stirring bar is charged with 2 liters of tap water having an adjusted alkalinity of 500 ppm calculated as calcium carbonate, adjustment being accomplished by adding sodium bicarbonate and sodium carbonate in a molar ratio of 1:0.1 to the tap water to give a final pH of about 8.6. Next are added to the vessel 4.9 grams (500 parts active solids per million parts of water) of the solution of Example A. Agitation is commenced, 5 ml. of a commercial acrylic lacquer (Lucite Acrylic Lacquer B 8322LH are added to the vessel, agitation is continued at 200-300 rpm for 5 minutes and the resulting mixture is allowed to settle. The detackifying characteristics of the resulting mixture, evaluated according to the procedure of Example 1, are rated 1, excellent. When the procedure of this example is repeated except that the solution of Example A is omitted, the detackifying characteristics are rated 5, failure.

What I claim and desire to protect by Letters Patent is:

1. In a process comprising: (a) detackifying over-sprayed paints, lacquers or enamels entrained in water circulated in a water wash paint spray operation and (b) separating detackified, over-sprayed paints, lacquers or enamels from said water, the improvement comprising adding to the water being circulated, for the purpose of detackifying said over-sprayed paints, lacquers or enamels, an effective amount of a water-soluble resinous reaction product of a polymer of n-alkyldiallylamine hydrohalide and epihalohydrin having the following structure:

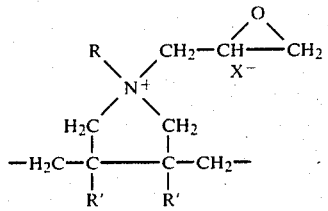

or

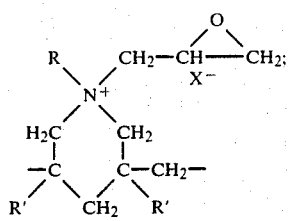

wherein R is C$_{16}$ alkyl, R' is hydrogen or a lower alkyl group and X is halide; wherein the number average molecular weight of said resinous reaction product ranges from 2,000 to 500,000, and wherein the pH of said water is maintained at at least about 6.

2. The process of claim 1 wherein the water contains an alkaline pH control agent.

3. The process of claim 2 wherein the resinous reaction product is a poly(N-methyldiallylamine)-epichlorohydrin resin.

4. The process of claim 3 wherein the paint, lacquer or enamel is solvent-borne.

5. The process of claim 4 wherein the resin is used in conjunction with a nonionic surfactant.

6. The process of claim 4 wherein the resin is used in conjunction with a multi-valent metal salt.

7. The process of claim 6 wherein the multi-valent metal salt is at least one water soluble salt of zinc, iron, aluminum, calcium, magnesium or tin.

8. The process of claim 6 wherein the multi-valent metal salt comprises zinc chloride.

* * * * *